United States Patent [19]
Russell

[11] Patent Number: 5,156,491
[45] Date of Patent: Oct. 20, 1992

[54] GROUNDLINE STABILIZING DEVICE

[76] Inventor: Jim L. Russell, 5018 S. Irvington, Tulsa, Okla. 74135

[21] Appl. No.: 763,946

[22] Filed: Sep. 23, 1991

[51] Int. Cl.$^5$ .............................................. F16L 1/06
[52] U.S. Cl. ...................................... 405/157; 248/49
[58] Field of Search ............... 405/154, 157, 169, 172; 248/49, 68.1

[56] References Cited

U.S. PATENT DOCUMENTS

| | | | |
|---|---|---|---|
| 3,747,355 | 7/1973 | Howard | 405/157 |
| 3,895,496 | 7/1975 | Perrott et al. | 405/157 X |
| 4,183,484 | 9/1980 | Mathews | 248/49 |
| 4,273,465 | 6/1981 | Schoen | 248/68.1 X |
| 4,993,670 | 2/1991 | Tesar | 248/68.1 |

FOREIGN PATENT DOCUMENTS 2715127 10/1978 Fed. Rep. of Germany ...... 405/157

Primary Examiner—David H. Corbin
Attorney, Agent, or Firm—Head & Johnson

[57] ABSTRACT

A groundline stabilizing device for stablizing in-ground pipes in their original in-ground relationship has a spacing bar with clamp members fixed to its ends for receiving the pipes in transverse alignment with respect to the bar, and a plate fixed to the bar in parallel relationship to a plane passing through the bar and the pipes received in the clamps which responds to shifts in the earth to stabilize the position of the pipes relative to the surrounding earth, minimizing radial shifts on one pipe in relation to the other.

13 Claims, 2 Drawing Sheets

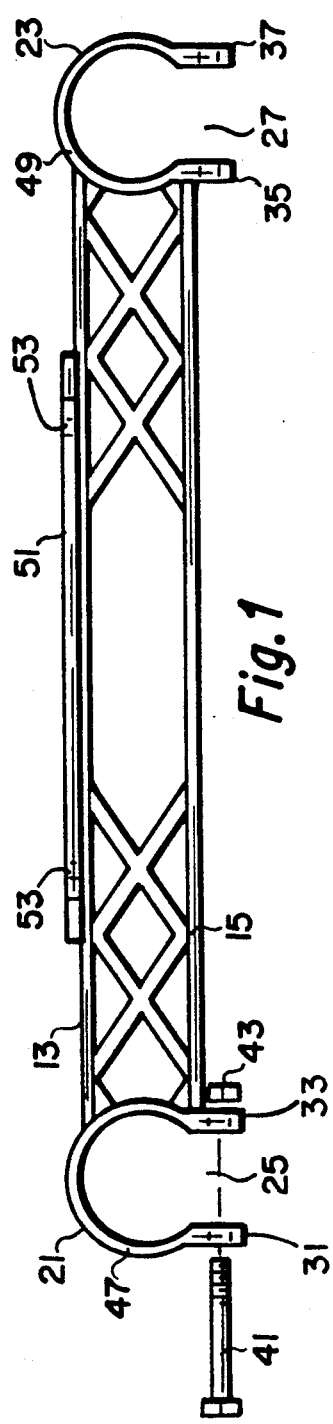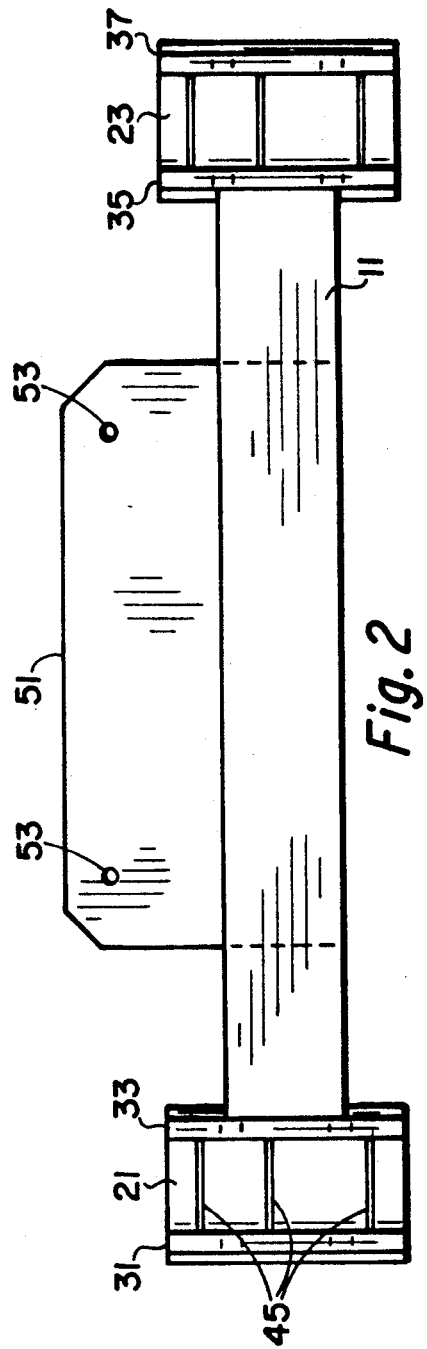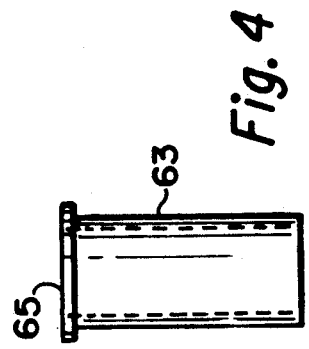

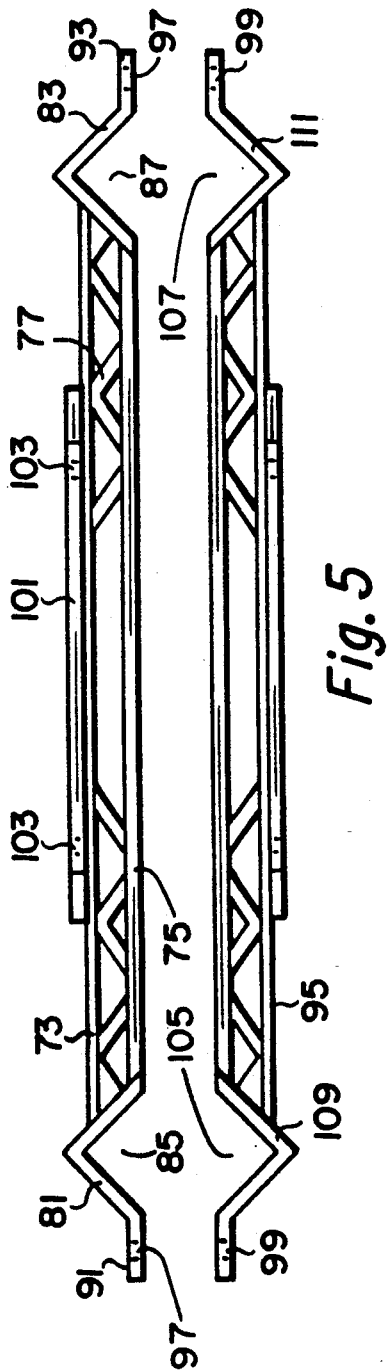
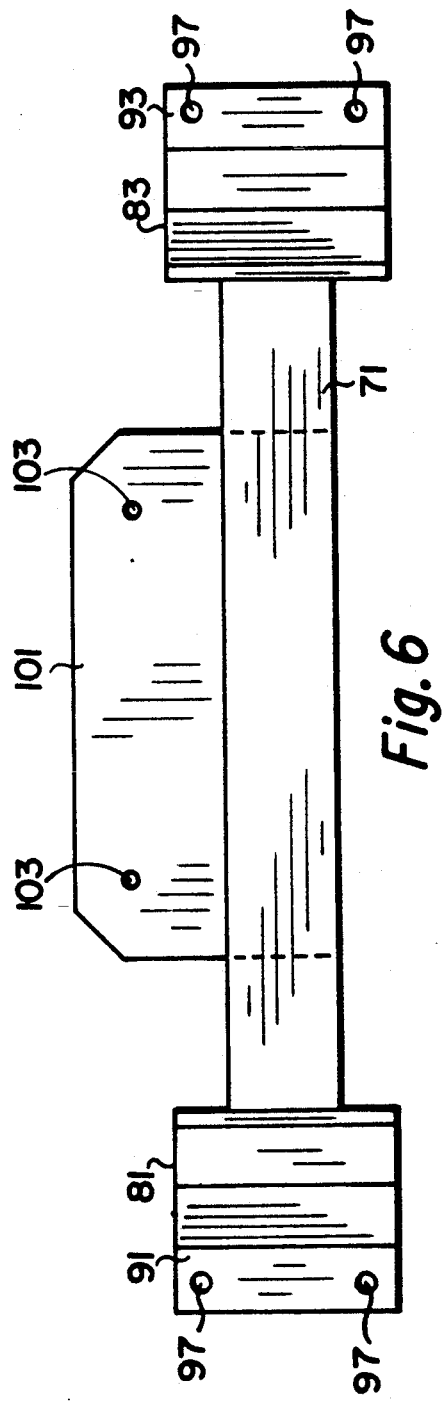

GROUNDLINE STABILIZING DEVICE

BACKGROUND OF THE INVENTION

This invention relates generally to pipe system assemblies and more particularly concerns a device for the stabilization of in-ground pipelines.

Underground pipelines, such as those in gas distribution systems, are typically installed by the laying of pipe in a ditch or trench and covering of the pipe with earth. The pipes are generally entirely independent of each other at fixed connection points to metering and the like. As a consequence, the pipes are free to shift in relation to each other in response to shifts in soil caused by erosion or external pressures. Consequently, the pipelines are subject to stress and fracture, particularly at the connection point.

Presently known devices used in clamping or spacing pipes in parallel relationship in above-ground application are generally unsuitable for in-ground locations because, while they secure the pipes in spaced relation to each other, they make no provision for changes in the radial disposition of one pipe in relation to the other.

It is therefore an object of the present invention to provide a stabilizing device for in-ground pipes that minimizes the displacement between pipes that may be caused by the shifting of surrounding earth. A further object of this invention is to minimize radial shifting of one pipe in relation to another.

SUMMARY OF THE INVENTION

In accordance with the invention a groundline stabilizing device is provided for stabilizing in-ground pipes in their original in-ground relationship to the ground and to each other. The device consists of a spacing bar having clamp members fixed to its ends for receiving the pipes in transverse alignment with respect to the bar. A plate fixed to the bar in parallel relationship to a plane passing through the bar and the pipes received in the clamps responds to shifts in the earth to stabilize the position of the pipes relative to the surrounding earth, minimizing radial shifts of one pipe in relation to the other.

In one embodiment, the clamps are flexible C-shaped members which receive the pipes in a snap-fit engagement. The clamp grip may be further enhanced by serration of the interior surface of the clamp member and also by the use of a nut and bolt arrangement to draw the C-shaped clamp into a tight gripping condition about the pipe inserted therein. In another embodiment, the clamp is V-shaped and an engaging bar extends across the clamp members and the pipes received therein to grip the pipes therebetween. Bolts extending through a flange on each of the V-shaped clamps and the engaging bar draw the bar and the clamps together to firmly secure the pipes between the bar and the clamps. In one especially preferred embodiment, the engaging bar is a complementary device to the stabilizer so that the pipes are secured between oppositely faced V-shaped clamps.

BRIEF DESCRIPTION OF THE DRAWINGS

Other objects and advantages of the invention will become apparent upon reading the following detailed description and upon reference to the drawings in which:

FIG. 1 is a plan view of the C-clamp embodiment of the groundline stabilizing device;

FIG. 2 is a front elevation of the device of FIG. 1;

FIG. 3 is a top plan view of a pipe size adapter for use with the stabilizer of FIG. 1;

FIG. 4 is a front elevation view of the adapter of FIG. 3;

FIG. 5 is a top plan view of the V-clamp embodiment of the groundline stabilizer; and FIG. 6 is a front elevation view of the stabilizer of FIG. 5.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Turning first to FIGS. 1 and 2, a C-clamp embodiment of the groundline stabilizer is illustrated. A spacing bar 11 consists of a pair of face plates 13 and 15 spaced apart by a lattice 17. Each end of the bar 11 has fixed thereto a C-shaped clamp 21 and 23. Each of the clamps 21 and 23 is resiliently flexible so as to receive a pipe therein in a snap-fit engagement. The openings 25 and 27 of the clamps 21 and 23 are aligned so that the pipes can be received therein in parallel transverse alignment with respect to the bar 11. The edges of each of the clamps 21 and 23 are provided with flanges 31, 33, 35 and 37 with oppositely faced holes disposed therethrough. Thus, bolts 41 may be inserted through oppositely faced holes so that application of nuts 43 will tighten the clamps into a firm gripping condition in relation to the pipes. The interior surface of the clamps 21 and 23 may also be provided with serrations 45 to further enhance the gripping quality of the clamps 21 and 23.

Fixed to the bar 11 is a plate 51 which extends in a parallel relationship to a plane passing through the bar 11 and the pipes received in the clamps 21 and 23. The plate 51 provides an increased surface area between the clamps 21 and 23 so that shifting of the ground surrounding the pipes in the device will cause the plate 51 and therefore the bar 11 and the clamps 21 and 23 to resist movement in a direction normal to the bar 11 and the pipes. That is, the stabilizing device and the pipes will tend to move simultaneously with the ground shift, thereby minimizing radial movement of one pipe about the other pipe. Preferably, the plate 51 will be provided with holes 53 which will readily permit securing of the stabilizer to a third pipe or post or the like, perhaps by the use of a U-bolt or other suitable connecting means.

The diameter of the C-shaped clamps 21 and 23 will typically be selected for use in applications with 1" to 1¼" diameter pipe. To adapt the device to smaller pipe, such as ¾" for example, the sleeve 61 illustrated in FIGS. 3 and 4 may be used. The sleeve consists of mating semi-cylindrical members having a tubular portion 63 with a lip 65 extending externally of its upper edge. Thus, when smaller pipe is being laid, the mating portions of the sleeve 61 can be adapted to the pipe and snapped with the pipe into position within the C-clamps 21 or 23. The lip 65 is adapted to be seated on the upper edges 47 or 49 of the clamps 21 or 23 to provide additional stability to the arrangement.

Turning now to FIGS. 5 and 6, a V-shaped clamp embodiment of the groundline stabilizer is illustrated. The V-shaped stabilizer has a spacing bar 71 which consists of a pair of face plates 73 and 75 spaced apart by a lattice or truss 77. At each end of the bar 71, a V-shaped clamp 81 or 83 is fixed in alignment such that parallel pipes disposed in the clamps 81 and 83 will lie in transverse alignment with respect to the bar 71. The edges of the V-shaped clamps 81 and 83 are provided with flanges 91 and 93. An engaging member 95 extends across the V-shaped clamps 81 and 83 and the pipes received therein to engage the pipes between the clamps 81 and 83 and the engaging member 95. Holes 97 in the clamps 81 and 83 align with oppositely faced holes 99 in the engaging member 95 so that threaded bolts and nuts can be applied in similar fashion to that illustrated in FIG. 1 to draw the stabilizer and the engaging member 95 into tight engagement with the pipes. The bar 71 has fixed thereto a plate 101 preferably with holes 103 provided through it, according to the description and for the reasons hereinbefore stated with respect to the stabilizer illustrated in FIGS. 1 and 2.

As illustrated in FIG. 5, the engaging member 95 will preferably be an inverted or complementary device to the stabilizer, the openings 85 and 87 of the V-shaped clamps 81 and 83 facing and aligning complementary openings 105 and 107 of V-shaped clamps 109 and 111 of the engaging member. This embodiment is preferred for use with pipes of a diameter of two inches or greater.

Preferably, the device will be formed as an integral structure of plastic, polyethylene or fiberglass and nylon so as to be noncorrosive. The lattice or truss configuration of the spacing bar is preferred because it is lightweight and strong, but further because the lattice arrangement provides for additional ground contact with the stabilizer so as to further enhance the stability of the stabilizer within the ground.

Thus, it is apparent that there has been provided, in accordance with the invention, a groundline stabilizing device that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. For stabilizing in-ground pipes in predetermined spaced-apart parallel relationship, a device comprising:
    a spacing bar;
    first means fixed to one end of said bar for receiving a first pipe therein in transverse alignment with respect to said bar;
    second means fixed to another end of said bar for receiving a second pipe therein in parallel alignment with respect to the first pipe;
    third means adapted for cooperation with said first means to source the first pipe therein;
    fourth means adapted for cooperation with said second means to secure the second pipe therein; and
    fifth means fixed to and extending substantially beyond at least a portion of a perimeter of said bar for resisting movement of said device in relation to the ground in a direction normal to said bar and to the pipes.

2. A device according to claim 1, said fifth means comprising a plate fixed to said bar in parallel relationship to a plane passing through said bar and the pipes received in said clamp members.

3. A device according to claim 1, said first and second means each comprising a resiliently flexible C-shaped clamp member for receiving a pipe in a snap-fit engagement.

4. A device according to claim 3, said third and fourth means each comprising:
    a pair of flanges, one extending from each edge of their respective said C-shaped clamp member; and
    means for drawing said pair of flanges toward each other.

5. A device according to claim 4, each of said members having a serrated interior surface for firmly gripping the pipe received therein.

6. A device according to claim 4, each of said drawing means comprising at least one pair of holes oppositely disposed in said pair of flanges, a bolt extending therethrough and a tightening nut threaded on said bolt.

7. A device according to claim 1, said first and second means each comprising a rigid V-shaped clamp member.

8. A device according to claim 7, said third and fourth means comprising:
    a pair of flanges, one extending from each of said V-shaped clamp members;
    means extending across said first and second means and the pipes secured therein for engaging the pipes therebetween; and
    means for drawing said flanges toward said engaging means.

9. A device according to claim 8, each of said members having a serrated interior surface for firmly gripping the pipe received therein.

10. A device according to claim 8, each of said drawing means comprising holes oppositely disposed in said flanges and said engaging means, a bolt extending through each pair of oppositely aligned holes and a tightening nut threaded on each said bolt.

11. A device according to claim 8, said engaging means comprising a complementary device to said stabilizing device.

12. For stabilizing in-ground pipes in predetermined spaced-apart parallel relationship, a device comprising:
    a spacing bar;
    a first clamp member fixed to one end of said bar for receiving a first pipe therein in transverse alignment with respect to said bar;
    a second clamp member fixed to another end of said bar for receiving a second pipe therein in parallel alignment with respect to the first pipe;
    first means adapted for cooperation with said first clamp member to secure the first pipe therein;
    second means adapted for cooperation with said second clamp member to secure the second pipe therein; and
    a plate fixed to and extending substantially beyond at least a portion of a perimeter of said bar in parallel relationship to a plane passing through said bar and the pipes received in said clamp members for resisting movement of said device in relation to the ground in a direction normal to said plane.

13. For stabilizing in-ground pipes in predetermined spaced-apart parallel relationship, a device comprising:
    a spacing bar having front and rear faces integrally extending across a trusslike member;

a first clamp member integrally disposed on one end of said bar for receiving a first pipe therein in transverse alignment with respect to said bar;

a second clamp member integrally disposed on another end of said bar for receiving a second pipe therein in parallel alignment with respect to the first pipe;

first means adapted for cooperation with said first clamp member to secure the first pipe therein;

second means adapted for cooperation with said second clamp member to secure the second pipe therein; and a plate integrally extending from and substantially beyond at least a portion of a perimeter of said bar in parallel relationship to a plane passing through said bar and the pipes received in said clamp members for resisting movement of said device in relation to the ground in a direction normal to said plane.

* * * * *